(12) United States Patent
Fasick

(10) Patent No.: US 11,370,481 B2
(45) Date of Patent: Jun. 28, 2022

(54) STEERING SYSTEM FOR AN AGRICULTURAL VEHICLE

(71) Applicant: CNH Industrial America LLC, New Holland, PA (US)

(72) Inventor: Gregory T. Fasick, Hatfield, PA (US)

(73) Assignee: CNH Industrial America LLC, New Holland, PA (US)

(*) Notice: Subject to any disclaimer, the term of this patent is extended or adjusted under 35 U.S.C. 154(b) by 414 days.

(21) Appl. No.: 16/677,039

(22) Filed: Nov. 7, 2019

(65) Prior Publication Data

US 2021/0139073 A1    May 13, 2021

(51) Int. Cl.
*B62D 5/09*    (2006.01)
*A01B 69/04*   (2006.01)
*B62D 1/04*    (2006.01)

(52) U.S. Cl.
CPC ............ *B62D 5/091* (2013.01); *A01B 69/008* (2013.01); *B62D 1/046* (2013.01)

(58) Field of Classification Search
None
See application file for complete search history.

(56) References Cited

U.S. PATENT DOCUMENTS

| 5,921,335 | A | 7/1999 | Straetker | |
|---|---|---|---|---|
| 5,948,029 | A | 9/1999 | Straetker | |
| 6,488,113 | B1 * | 12/2002 | Worpell | B62D 7/148 701/41 |
| 2015/0223386 | A1 * | 8/2015 | Nafziger | A01B 69/007 180/6.24 |

FOREIGN PATENT DOCUMENTS

GB    2303829 A    3/1997

* cited by examiner

*Primary Examiner* — Tamara L Weber
(74) *Attorney, Agent, or Firm* — Peter Zacharias; Patrick Sheldrake

(57) ABSTRACT

A steering system for an agricultural vehicle that includes a steering wheel, a steering wheel sensor operably connected to the steering wheel, a drive selector having a forward position, a neutral position, and a reverse position, an actuating device configured for being operably connected to the steerable wheels of the agricultural vehicle, and an electronic control unit operably connected to the steering wheel sensor, the drive selector, and the actuating device. The electronic control unit is configured for selectively preventing a rotation of the steering wheel from steering the steerable wheels in the neutral position of the drive selector.

20 Claims, 3 Drawing Sheets

STEERING SYSTEM FOR AN AGRICULTURAL VEHICLE

BACKGROUND OF THE INVENTION

The present invention pertains to windrowers and, more specifically, to a neutral steering system for a windrower.

An agricultural vehicle known as a "windrower" is used to cut and place crop material into a windrow for subsequent harvesting or baling by another agricultural machine in a secondary operation. A windrower can be self-propelled and may include a chassis, wheels supporting the chassis, a prime mover, a cab, and a detachable header such as a sicklebar header or a draper header for cutting and placing the crop material on the field in the windrow. Some of the crops processed by windrowers include hay, forage, and other small-grain crops.

Generally, a self-propelled windrower is configured as a differential steer machine, i.e., dual path steering machine, which includes a tandem pump and two independent wheel motors. As the operator steers the wheel within the cab, the steering mechanism transmutes the rotational movement of the steering wheel, and shaft attached thereto, into fluid displacement of the pumps in order to turn the wheels and thus steer the windrower. Given the drive architecture of a hydraulic or mechanical differential steer machine, the steering wheel may also move with the windrower while the windrower is in neutral; and hence, the windrower may rotate or turn while in neutral. As can be appreciated, it may be undesirable for the windrower to turn while it is still in neutral.

What is needed in the art is a steering system for a windrower that has multiple neutral steering settings to accommodate various operating conditions while the windrower is in neutral.

SUMMARY OF THE INVENTION

In one exemplary embodiment formed in accordance with the present invention, there is provided a steering system for an agricultural vehicle that includes a steering wheel, a steering wheel sensor operably connected to the steering wheel, a drive selector having a forward position, a neutral position, and a reverse position, an actuating device configured for being operably connected to the steerable wheels of the agricultural vehicle, and an electronic control unit operably connected to the steering wheel sensor, the drive selector, and the actuating device. The electronic control unit is configured for selectively preventing a rotation of the steering wheel from steering the steerable wheels in the neutral position of the drive selector depending upon various machine operations.

In another exemplary embodiment formed in accordance with the present invention, there is provided a steering system for an agricultural vehicle which includes at least two steerable wheels. The steering system includes a steering wheel configured for steering the at least two steerable wheels, a steering wheel sensor operably connected to the steering wheel and configured for sensing a movement of the steering wheel, and a drive selector. The drive selector includes a forward position, a neutral position, and a reverse position for operating the agricultural vehicle in one of a forward drive configuration, a neutral drive configuration, and a reverse drive configuration. The steering system also includes an actuating device configured for being operably connected to the at least two steerable wheels and configured for moving the at least two steerable wheels and an electronic control unit operably connected to the steering wheel sensor, the drive selector, and the actuating device. The electronic control unit is configured for selectively preventing a rotation of the steering wheel from steering the at least two steerable wheels in the neutral position of the drive selector.

In yet another exemplary embodiment formed in accordance with the present invention, there is provided an agricultural vehicle that includes a chassis, at least two steerable wheels connected to the chassis, and a steering system. The steering system includes a steering wheel supported by the chassis and configured for steering the at least two steerable wheels, a steering wheel sensor operably connected to the steering wheel and configured for sensing a movement of the steering wheel, and a drive selector. The drive selector includes a forward position, a neutral position, and a reverse position for operating the agricultural vehicle in one of a forward drive configuration, a neutral drive configuration, and a reverse drive configuration. The steering system also includes an actuating device operably connected to the at least two steerable wheels and configured for moving the at least two steerable wheels. The agricultural vehicle also includes an electronic control unit operably connected to the steering wheel sensor, the drive selector, and the actuating device. The electronic control unit is configured for selectively preventing a rotation of the steering wheel from steering the at least two steerable wheels in the neutral position of the drive selector.

In yet another exemplary embodiment formed in accordance with the present invention, there is provided a method for operating an agricultural vehicle. The method includes an initial step of providing a steering system for the agricultural vehicle. The steering system includes a steering wheel configured for steering at least two steerable wheels of the agricultural vehicle, a steering wheel sensor operably connected to the steering wheel, and a drive selector. The drive selector includes a forward position, a neutral position, and a reverse position for operating the agricultural vehicle in one of a forward drive configuration, a neutral drive configuration, and a reverse drive configuration. The steering system also includes an actuating device configured for being operably connected to the at least two steerable wheels and configured for moving the at least two steerable wheels, and an electronic control unit operably connected to the steering wheel sensor, the drive selector, and the actuating device. The method includes the further steps of positioning, by the drive selector, the agricultural vehicle in the neutral drive configuration and sensing, by the steering wheel sensor, a movement of the steering wheel. The method also includes the step of selectively preventing, by the electronic control unit, a rotation of the steering wheel from steering the at least two steerable wheels in the neutral position of the drive selector.

One possible advantage of the exemplary embodiment of the agricultural vehicle is that the steering system allows or prevents counter-rotation of the steered wheels of the windrower depending upon various machine operational modes.

Another possible advantage of the exemplary embodiment of the agricultural vehicle is that the steering system may keep any undesired machine movement to a minimum which is inherently present in a differential steering machine.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural vehicle and/or components thereof are usually determined with reference to the direction of forward operative travel of the vehicle, but they should not be construed as limiting. The terms "longitudinal" and "transverse" are determined with reference to the fore-and-aft direction of the agricultural vehicle and are equally not to be construed as limiting.

Figure 1:
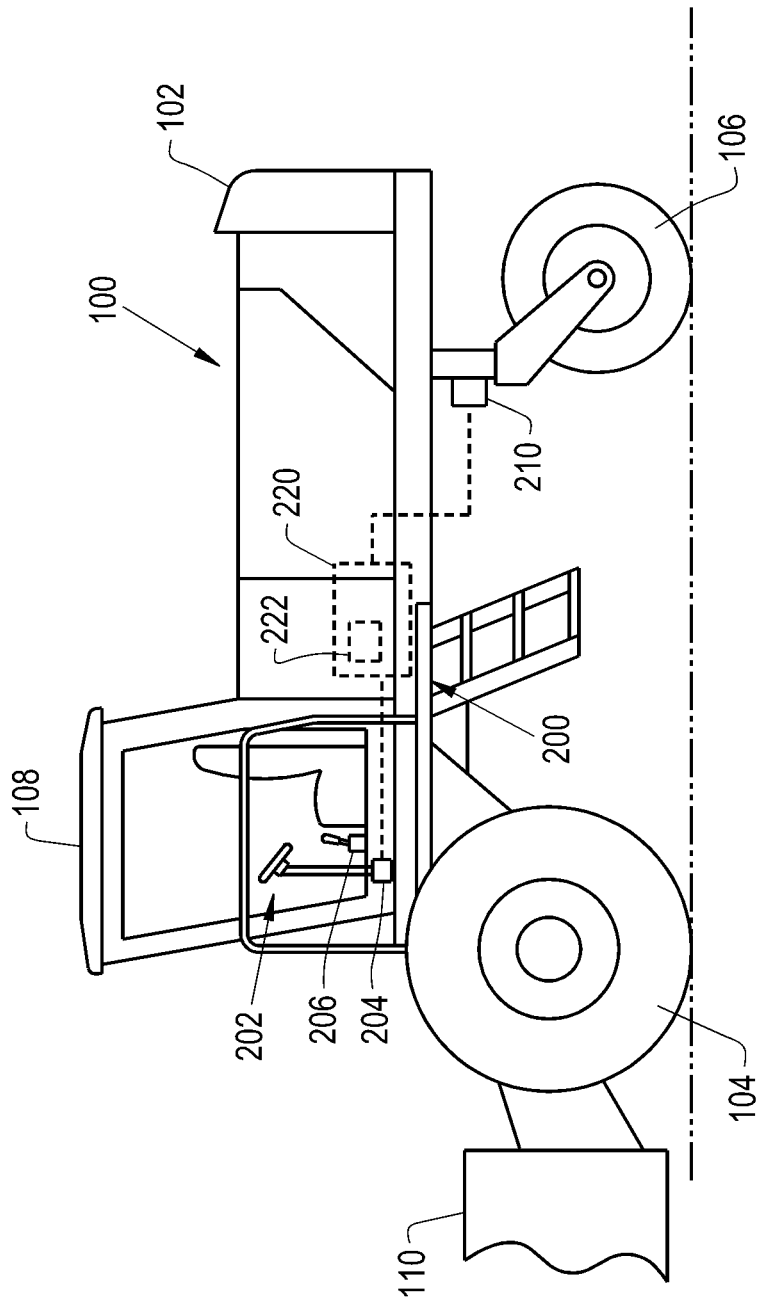
FIG. 1 illustrates a side view of an exemplary embodiment of an agricultural vehicle, the agricultural vehicle including a steering system, in accordance with an exemplary embodiment of the present invention.
Figure 2:
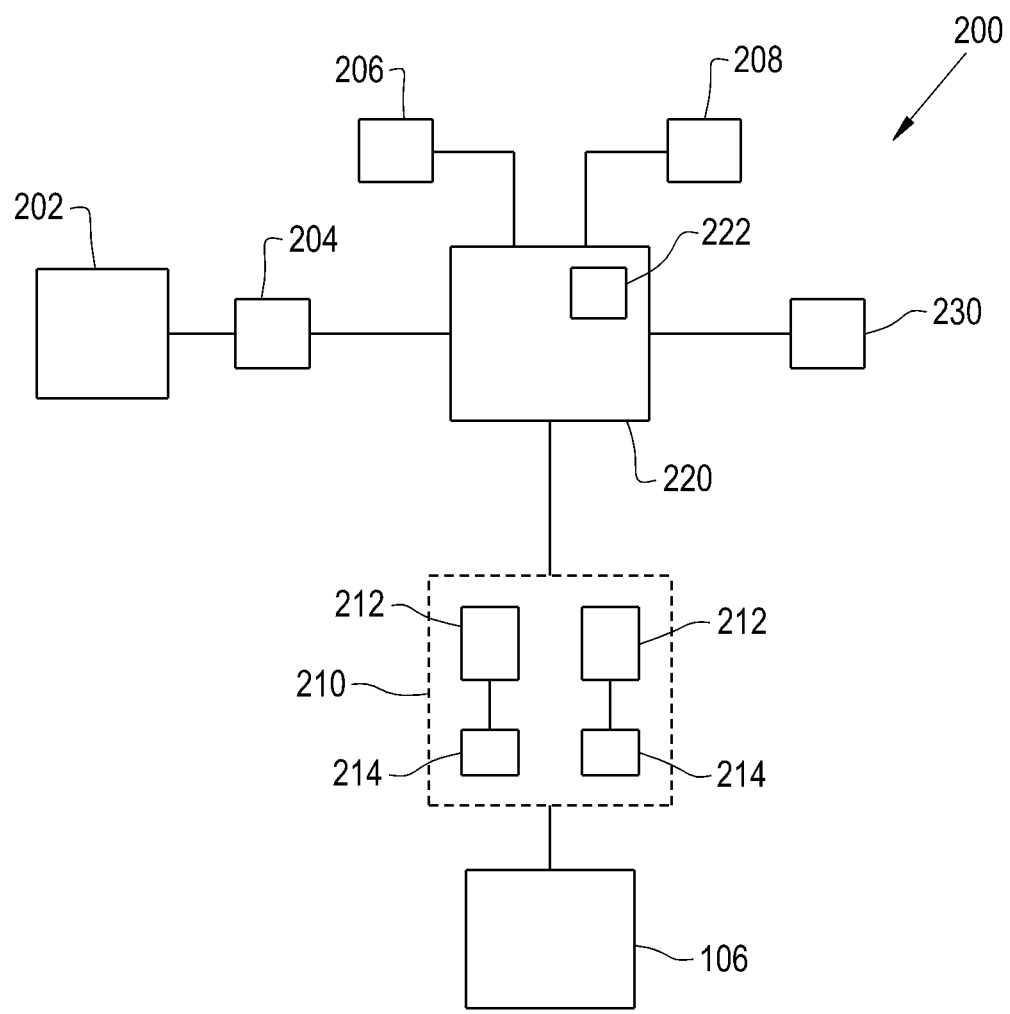
FIG. 2 illustrates a block diagram of the steering system of FIG. 1.

Referring now to the drawings, and more particularly to FIGS. 1-2, there is shown an agricultural vehicle 100 in the form of a self-propelled windrower 100. However, the agricultural vehicle 100 may be in the form of any desired windrower or swather. The windrower 100 generally includes a chassis 102, front and rear wheels 104, 106, a prime mover (not shown), a cab 108, and a header 110 removably connected to the chassis 102. The prime mover may drive the front wheels 104. The rear wheels 106 may be configured as steerable, follower or caster wheels 106. The header 110 may generally include a cutting mechanism, such as a sickle bar or rotary cutter, and a conveyor or feeder mechanism. The header 110 can be in the form of any desired header.

The windrower 100 may also include a steering system 200 in the form of a steer-by-wire system 200 for steering or rotating the rear wheels 106. The steering system 200 in essence allows the agricultural vehicle 100 to be a differential steer machine, i.e., a dual path steering machine. The steering system 200 generally includes a steering wheel 202, a steering wheel sensor 204, a drive selector 206, a parking brake 208, an actuating device 210 for moving the wheels 106, and an electrical processing circuit 220, e.g. controller 220, for electronically transmuting the movement of the steering wheel 202 to control the actuating device 210 and thereby steer the wheels 106. Hence, the steering system 200 does not have a physical mechanical and/or hydraulic connected between the steering wheel 202, the drive selector 206, and the actuating device 220. The controller 220 may also selectively prevent a rotation of the steering wheel 202 from steering the wheels 106 while the windrower 100 is in neutral depending upon a machine operation.

The steering wheel 202 is supported by the chassis 102 and is located within the cab 108. The steering wheel 202 may also include a steering column or shaft extending outwardly from the rear of the steering wheel 202 (unnumbered). The steering wheel 202 may be rotated in either direction while the windrower 100 is in forward, neutral, or reverse. As can be appreciated, the steering wheel 202 may counter-rotate. As used herein, "counter-rotate" in neutral refers to the motion, i.e., rotation or steering, of the windrower 100 and/or steering wheels 202 when the windrower 100 is in neutral. The steering wheel 202 may be in the form of any desired steering wheel.

The steering wheel sensor 204 is operably connected to the steering wheel 202 and senses a movement thereof. The sensor 204 may be directly connected or positioned adjacent to the steering wheel 202 at any desired location. For example, the sensor 204 can be connected to the steering column of the steering wheel 202. The sensor 204 may sense a rotation, a rotational acceleration, and/or a torque inputted onto the steering wheel 202 by the operator. The sensor 204 may be in the form of a position sensor, such as an angle position sensor, and/or a torque sensor. For example, the sensor 204 may be a digital, optical sensor which measures the rate and angle of rotation. However, the sensor 204 may be in the form of any desired sensor. It should be appreciated that the steering system 200 may include more than one steering sensor, such as two or more sensors for measuring any desired movement or force exerted on the steering wheels 202.

The drive selector 206 is supported by the chassis 102 and located within the cab 108. The drive selector 206 may be in the form of a forward, neutral, and reverse (FNR) switch or lever 206. Hence, the drive selector 206 has a forward position, a neutral position, and a reverse position for operating the windrower 100 in the forward, neutral, or reverse drive configuration. The drive selector 206 may be in the form of any desired analog and/or digital selector.

The actuating device 210 is operably connected to the wheels 106 for moving, e.g. steering and/or propelling, the wheels 106. The actuating device 210 may include a pair of hydraulic pumps 212 and motors 214 which are respectively associated with a respective wheel 106 for steering each wheel 106. The hydraulic pumps 212 and motors 214 may be coupled to each other, the prime mover, and the wheels 106 in a known configuration. The actuating device 210 may further include various electrical and/or fluid lines, valves, accumulators, actuators, arms, swashplates, and/or driveshafts. The actuating device 210 may be in the form of any desired electric and/or hydraulic actuating device or assembly. It is conceivable that the actuating device 210 is operably connected to the front and rear wheels 104, 106 for steering and/or propelling the wheels 104, 106.

The controller 220 is operably connected to the steering wheel sensor 204, the drive selector 206, and the actuating device 210 via a wired and/or wireless connection. The controller 220 may selectively preventing a rotation of the steering wheel 202 from steering the wheels 106 while the windrower 100 is in neutral. Thus, the steering system 200 can have different neutral control, i.e., steering, settings based upon the operational mode of the windrower 100. For example, the controller 220 may prevent the counter-rotation of the steering wheel 202 in the neutral position of the drive selector 206 in a road operational mode and a non-harvesting operational mode. The controller 220 may allow the counter-rotation of the steering wheel 202 in the neutral position of the drive selector 206 in a header connection operational mode, a spin turn operational mode, and a harvesting operational mode. As can be appreciated, the header connection operational mode may encompass the connection or disconnection of the header 110 to or from the windrower 100. Furthermore, the controller 220 may prevent the counter-rotation of the steering wheel 202 in the neutral position of the drive selector 206 when the parking brake 208 is activated. The controller 220 can be in the form of any desired control unit with a memory 222. The controller 220 may be a separate control unit or incorporated within existing hardware and/or software of the windrower 100. It should be appreciated that the controller 220 may be part of the steering system 200 and/or the windrower 100.

According to a further development of the exemplary embodiment of the present invention, the operator may also input a user command via a user interface 230 so that the controller 220 will accordingly allow or prevent counter-rotation of the steering wheel 202 while the windrower 100 is in neutral. In this regard, the controller 220 and/or the operator may selectively prevent the motion of the steering wheel 202 from steering the wheels 106 and the motion of the wheels 106 from turning the steering wheel 202. It should be appreciated that the user interface 230 may be in the form of any desired analog and/or digital device such as a switch, button, touch screen, etc.

Figure 3:
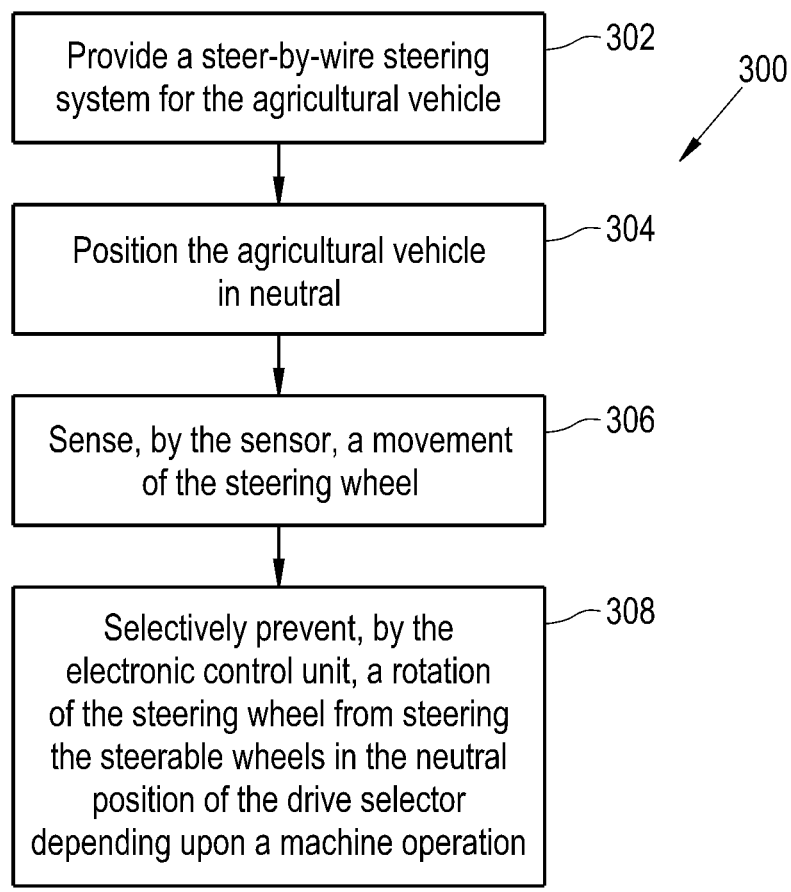
FIG. 3 illustrates a method for operating the agricultural vehicle for selectively preventing counter-rotation in neutral.

Referring now to FIG. 3, there is shown a method 300 for operating the windrower 100. The method 300 includes an initial step of providing the steering system 200, as discussed above (at block 302). Next, the windrower 100 may be positioned in neutral by positioning the drive selector 206 in its neutral position (at block 304). It should be appreciated that the operator and/or the controller 220 may position the windrower 100 in neutral. The method 300 may then include a step of sensing a movement of the steering wheel 202 via the sensor 204 (at block 306). Then, the method 300 may include a step of selectively preventing a rotation of the steering wheel 202 from steering the wheels 106 while the windrow 100 is in neutral (at block 308). The selectively preventing step 308 may include preventing a counter-rotation of the steering wheel in the neutral position of the drive selector 206 in a road operational mode and a non-harvesting operational mode. The selectively preventing step 308 may further include a step of allowing counter-rotation to occur in the neutral position of the drive selector 206 in a header connection operational mode and a harvesting operational mode, e.g. power take off running or header operating. The controller 220 may automatically operably connect or disconnect the steering wheel 202 from the actuating device 210. Additionally or alternatively, the operator may input a user command in the user interface 230 to selectively prevent counter-rotation.

It is to be understood that the method 300 can be performed by the controller 220 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 220 described herein, such as the method 300, is implemented in software code or instructions which are tangibly stored on a tangible computer readable medium. The controller 220 loads the software code or instructions via a direct interface with the computer readable medium or via a wired and/or wireless network. Upon loading and executing such software code or instructions by the controller 220, the controller 220 may perform any of the functionality of the controller 220 described herein, including any steps of the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A steering system for an agricultural vehicle comprising at least two steerable wheels, comprising:
    a steering wheel configured for steering the at least two steerable wheels;
    a steering wheel sensor operably connected to the steering wheel and configured for sensing a movement of the steering wheel;
    a drive selector comprising a forward position, a neutral position, and a reverse position for operating the agricultural vehicle in one of a forward drive configuration, a neutral drive configuration, and a reverse drive configuration;
    an actuating device configured for being operably connected to the at least two steerable wheels and configured for moving the at least two steerable wheels; and
    an electronic control unit operably connected to the steering wheel sensor, the drive selector, and the actuating device, and the electronic control unit is configured for selectively preventing a rotation of the steering wheel from steering the at least two steerable wheels in the neutral position of the drive selector.

2. The steering system of claim 1, wherein the steering system is a steer-by-wire steering system such that the electronic control unit is configured for controlling the actuating device to steer the agricultural vehicle in response to the movement of the steering wheel sensed by the steering wheel sensor.

3. The steering system of claim 2, wherein the steering system does not comprise a direct mechanical and hydraulic connection between the steering wheel and the actuating device.

4. The steering system of claim 1, wherein the electronic control unit is configured for preventing a counter-rotation of the steering wheel in the neutral position of the drive selector depending upon a machine operation.

5. The steering system of claim 4, wherein the electronic control unit is configured for allowing the counter-rotation of the steering wheel in the neutral position of the drive selector in a header connection operational mode and a harvesting operational mode.

6. The steering system of claim 4, wherein the electronic control unit is configured for preventing the counter-rotation of the steering wheel in the neutral position of the drive selector in a road operational mode and a non-harvesting operational mode.

7. The steering system of claim 4, further comprising a parking brake operably connected to the electronic control unit, and wherein the electronic control unit is configured for preventing the counter-rotation of the steering wheel in the neutral position of the drive selector depending upon an activation of the parking brake.

8. The steering system of claim 1, wherein the actuating device comprises a pair of hydraulic pumps and a pair of hydraulic motors respectively connected to the hydraulic pumps, and the hydraulic pumps and hydraulic motors are respectively associated with a respective steerable wheel for steering each steerable wheel.

9. An agricultural vehicle, comprising:
a chassis;
at least two steerable wheels connected to the chassis;
a steering system, comprising:
 a steering wheel supported by the chassis and configured for steering the at least two steerable wheels;
 a steering wheel sensor operably connected to the steering wheel and configured for sensing a movement of the steering wheel;
 a drive selector comprising a forward position, a neutral position, and a reverse position for operating the agricultural vehicle in one of a forward drive configuration, a neutral drive configuration, and a reverse drive configuration; and
 an actuating device operably connected to the at least two steerable wheels and configured for moving the at least two steerable wheels; and
an electronic control unit operably connected to the steering wheel sensor, the drive selector, and the actuating device, and the electronic control unit is configured for selectively preventing a rotation of the steering wheel from steering the at least two steerable wheels in the neutral position of the drive selector.

10. The agricultural vehicle of claim 9, wherein the steering system is a steer-by-wire steering system such that the electronic control unit is configured for controlling the actuating device to steer the agricultural vehicle in response to the movement of the steering wheel sensed by the steering wheel sensor.

11. The agricultural vehicle of claim 10, wherein the steering system does not comprise a direct mechanical and hydraulic connection between the steering wheel and the actuating device.

12. The agricultural vehicle of claim 9, wherein the electronic control unit is configured for preventing a counter-rotation of the steering wheel in the neutral position of the drive selector depending upon a machine operation.

13. The agricultural vehicle of claim 12, wherein the electronic control unit is configured for allowing the counter-rotation of the steering wheel in the neutral position of the drive selector in a header connection operational mode and a harvesting operational mode.

14. The agricultural vehicle of claim 12, wherein the electronic control unit is configured for preventing the counter-rotation of the steering wheel in the neutral position of the drive selector in a road operational mode and a non-harvesting operational mode.

15. The agricultural vehicle of claim 12, further comprising a parking brake operably connected to the electronic control unit, and wherein the electronic control unit is configured for preventing the counter-rotation of the steering wheel in the neutral position of the drive selector depending upon an activation of the parking brake.

16. The agricultural vehicle of claim 9, wherein the actuating device comprises a pair of hydraulic pumps and a pair of hydraulic motors respectively connected to the hydraulic pumps, and the hydraulic pumps and hydraulic motors are respectively associated with a respective steerable wheel for steering each steerable wheel.

17. A method for operating an agricultural vehicle, comprising:
providing a steering system for the agricultural vehicle comprising a steering wheel configured for steering at least two steerable wheels of the agricultural vehicle, a steering wheel sensor operably connected to the steering wheel, a drive selector comprising a forward position, a neutral position, and a reverse position for operating the agricultural vehicle in one of a forward drive configuration, a neutral drive configuration, and a reverse drive configuration, an actuating device configured for being operably connected to the at least two steerable wheels and configured for moving the at least two steerable wheels, and an electronic control unit operably connected to the steering wheel sensor, the drive selector, and the actuating device;
positioning, by the drive selector, the agricultural vehicle in the neutral drive configuration;
sensing, by the steering wheel sensor, a movement of the steering wheel; and
selectively preventing, by the electronic control unit, a rotation of the steering wheel from steering the at least two steerable wheels in the neutral position of the drive selector.

18. The method of claim 17, wherein the steering system is a steer-by-wire steering system such that the electronic control unit is configured for controlling the actuating device to steer the agricultural vehicle in response to the movement of the steering wheel sensed by the steering wheel sensor, and the steering system does not comprise a direct mechanical and hydraulic connection between the steering wheel and the actuating device.

19. The method of claim 17, further comprising a step of allowing, by the electronic control unit, a counter-rotation of the steering wheel in the neutral position of the drive selector in a header connection operational mode and a harvesting operational mode.

20. The method of claim 17, wherein the selectively preventing step further includes preventing, by the electronic control unit, a counter-rotation of the steering wheel in the neutral position of the drive selector in a road operational mode and a non-harvesting operational mode.

* * * * *